Patented June 17, 1947

2,422,620

UNITED STATES PATENT OFFICE 2,422,620

VITAMIN B6 INTERMEDIATES

Stanton A. Harris, Westfield, N. J., assignor to Merck & Co., Inc., Rahway, N. J., a corporation of New Jersey No Drawing. Application July 28, 1944, Serial No. 547,105

10 Claims. (Cl. 260—297)

This application relates generally to a process for the preparation of novel, chemical compounds; in a particular sense, it is concerned with the preparation of intermediates useful in the synthesis of vitamin B6 (2-methyl-3-hydroxy-4,5-dihydroxymethylpyridine).

This application is a continuation-in-part of the co-pending application by the same inventor, Serial No. 267,603, filed April 13, 1939.

The compounds forming the subject matter of the present invention are represented by the formula:

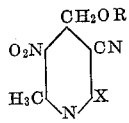

wherein R is an alkyl, aryl, or aralkyl group and X is a halogen. According to the present invention these compounds are obtained by halogenating, preferably with phosphorous pentahalide, or an equivalent reagent, a corresponding compound of the formula:

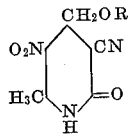

wherein R is as above.

It will be understood by those versed in the art that pyridones are equivalents of the corresponding hydroxy-pyridine, for example:

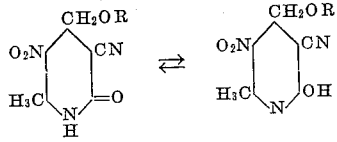

The following example illustrates methods of practicing the present invention, but it is to be understood that this example is given by way of illustration and not of limitation.

Example

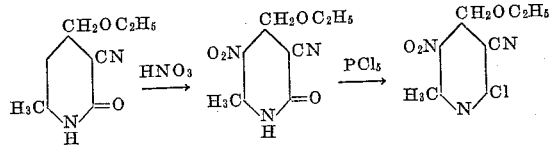

About 5 g. of 3-cyano-4-ethoxymethyl-6-methyl-2-pyridone (obtained by reacting ethoxyacetylacetone and cyano-acetamide) in 13 cc. of acetic anhydride is cooled and treated with 2.16 cc. of fuming nitric acid in 2 cc. of acetic anhydride, a little urea being added as a catalyst. The solid gradually dissolves with evolution of heat. The reaction mixture is maintained at a temperature below about 45° C. until the reaction is completed, as indicated by cessation of heat evolution. Upon pouring the mixture onto ice, crystallization of 3-cyano-4-ethoxymethyl-5-nitro-6-methyl-2-pyridone (M. P. 164-165° C.) takes place. The product is removed and purified by conventional operations.

About 60 g. of 3-cyano-4-ethoxymethyl-5-nitro-6-methyl-2-pyridone, 66 gms. of phosphorous pentachloride and 510 cc. of chlorobenzene are heated until solution is effected. The heating is continued until one half of the solvent is removed. The remaining solvent is removed under reduced pressure to yield a brown viscous residue. This residue is treated with about 100 cc. of water and 20 cc. of ethanol. The mixture of residue and solvent is extracted with petroleum ether, and the extracts concentrated first at atmospheric pressure and finally under diminished pressure to obtain a residue containing 2-methyl-3 - nitro-4-ethoxy-methyl-5-cyano-6-chloropyridine (M. P. 47-48° C.). The product, thus obtained, is purified by conventional operations.

In like manner 3-cyano-4-benzyloxymethyl-6-methyl-2-pyridone is nitrated and chlorinated to yield 2-methyl-3-nitro-4-benzyloxymethyl-5-cyano-6-chloropyridine; and 3-cyano-4-phenoxymethyl-6-methyl-2-pyridone is nitrated and chlorinated to yield 2-methyl-3-nitro-4-phenoxymethyl-5-cyano-6-chloro-pyridine.

Modifications may be made in carrying out the present invention without departing from the spirit and scope thereof and the invention is to be limited only by the appended claims.

I claim:

1. A compound represented by the formula:

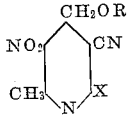

wherein R is selected from the class consisting of alkyl, aryl and aralkyl groups and X is a halogen.

2. A compound represented by the formula:

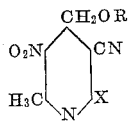

wherein R is an alkyl group and X is a halogen.

3. A compound represented by the formula:

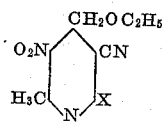

wherein X is a halogen.

4. A compound represented by the formula:

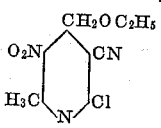

5. A compound represented by the formula:

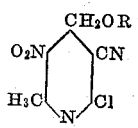

wherein R is an alkyl group.

6. The process that comprises reacting 3-cyano - 4 - alkoxymethyl - 5-nitro-6-methyl-2-pyridone with phosphorous pentahalide to obtain 2-methyl-3-nitro-4-alkoxymethyl-5-cyano - 6-halopyridine.

7. The process that comprises reacting 3-cyano - 4 - ethoxymethyl-5-nitro-6-methyl-2-pyridone with prosphorous pentahalide to obtain 2-methyl-3-nitro-4-ethoxymethyl-5-cyano - 6-halopyridine.

8. The process that comprises reacting 3-cyano - 4 - ethoxymethyl-5-nitro-6-methyl-2-pyridone with prosphorous pentachloride to obtain 2 - methyl - 3 - nitro-4-ethoxymethyl-5-cyano-6-chloropyridine.

9. The process that comprises reacting 3-cyano-5-nitro-6-methyl-2-pyridone having a 4-position substituent of the class consisting of alkoxymethyl, aryloxymethyl and aralkoxymethyl groups with phosphorous pentahalide and that is represented

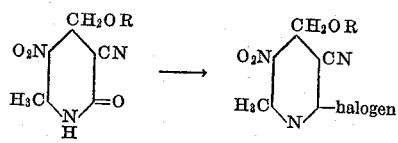

wherein R is selected from the class consisting of alkyl, aryl and aralkyl groups.

10. The process that comprises reacting 3-cyano - 4 - alkoxymethyl - 5-nitro-6-methyl-2-pyridone with phosphorous pentachloride to obtain 2 - methyl - 3-nitro - 4 - alkoxymethyl-5-cyano-6-chloropyridine.

STANTON A. HARRIS.